United States Patent [19]

Callander et al.

[11] Patent Number: 5,579,504

[45] Date of Patent: Nov. 26, 1996

[54] MULTI-PROCESSOR COMPUTER SYSTEM HAVING SHARED MEMORY, PRIVATE CACHE MEMORIES, AND INVALIDATE QUEUES HAVING VALID BITS AND FLUSH BITS FOR SERIALIZING TRANSACTIONS

[75] Inventors: Michael A. Callander, Hudson; G. Michael Uhler, Marlborough; W. Hugh Durdan, Waban, all of Mass.

[73] Assignee: Digital Equipment Corporation, Maynard, Mass.

[21] Appl. No.: 407,784

[22] Filed: Mar. 17, 1995

Related U.S. Application Data

[63] Continuation of Ser. No. 494,824, Mar. 15, 1990, abandoned, which is a continuation of Ser. No. 212,347, Jun. 27, 1988, abandoned.

[51] Int. Cl.$^6$ .............................. G06F 9/28; G06F 12/12
[52] U.S. Cl. ..................... 395/471; 395/462; 395/448; 364/DIG. 1; 364/DIG. 2; 364/931.4; 364/931.41; 364/931.46; 364/931.47
[58] Field of Search .................................. 395/448, 462, 395/468, 472, 471

[56] References Cited

U.S. PATENT DOCUMENTS

| | | | |
|---|---|---|---|
| 3,889,237 | 6/1978 | Alferness et al. | 364/200 |
| 3,938,097 | 2/1976 | Niguette, III | 340/172.5 |
| 4,141,067 | 2/1979 | McLagan | 364/200 |
| 4,142,234 | 2/1979 | Bean et al. | 364/200 |
| 4,161,024 | 7/1979 | Joyce et al. | 364/200 |
| 4,195,340 | 3/1980 | Joyce | 364/200 |
| 4,197,580 | 4/1980 | Chang et al. | 364/200 |
| 4,277,826 | 7/1981 | Collins et al. | 364/200 |
| 4,282,572 | 8/1981 | Morre, III et al. | 364/200 |
| 4,349,871 | 9/1982 | Lary | 364/200 |
| 4,371,928 | 2/1983 | Barlow et al. | 364/200 |
| 4,410,944 | 10/1983 | Kronies | 364/200 |
| 4,424,562 | 1/1984 | Genma et al. | 364/200 |
| 4,424,564 | 1/1984 | Hinai | 364/200 |
| 4,426,682 | 1/1984 | Riffe et al. | 364/200 |
| 4,445,174 | 4/1984 | Fletcher | 364/200 |
| 4,467,414 | 8/1984 | Akagi et al. | 364/200 |

(List continued on next page.)

OTHER PUBLICATIONS

Baer, "Multiprocessing," Encyclopedia of Computer Science and Engineering, 2d Ed., pp. 1003–1005, Von Nostrand Reinhold Company, 1983.

Anderson, "Cache Memory: The Secret of Increased Performance," Hardcopy, pp. 88–91, Oct., 1987.

Excerpt, Intel Microprocessor and Peripheral Handbook, vol. 1, Microprocessing, ©1980, Intel Corporation, Santa Clara, California, "82385 High Performance 32–Bit Cache Controller," pp. 290143–1 through 290143–56.

*Primary Examiner*—Thomas C. Lee
*Assistant Examiner*—D. Dinh
*Attorney, Agent, or Firm*—Mark J. Casey; Denis G. Maloney; Arthur W. Fisher

[57] ABSTRACT

Multi-processor systems are often implemented using a common system bus as the communication mechanism between CPU, memory, and I/O adapters. It is also common to include features on each CPU module, such as cache memory, that enhance the performance of the execution of instructions in the CPU. Many architectures require that the hardware employ a mechanism by which the data in the individual CPU cache memories is kept consistent with data in main memory and with data in other cache memories. One such method involves each CPU monitoring transactions on the system bus, and taking appropriate action when a transaction appears on the bus which would render data in the CPU's cache incoherent. If the CPU uses queues to hold records of incoming transaction information until it can service them, the bus interface must guarantee that the queued items are processed by the cache in the correct order. If this is not done, certain types of shared data protocols fail to operate correctly. The present invention describes a method by which hardware can guarantee the serialization of transactions requiring service by the CPU cache. The serialization method described guarantees that shared memory protocols operate correctly.

9 Claims, 2 Drawing Sheets

U.S. PATENT DOCUMENTS

| | | | |
|---|---|---|---|
| 4,504,902 | 3/1985 | Gallaher et al. | 364/200 |
| 4,525,777 | 6/1985 | Webster et al. | 364/200 |
| 4,616,310 | 10/1986 | Dill et al. | 364/200 |
| 4,622,631 | 11/1986 | Frank et al. | 364/200 |
| 4,648,030 | 3/1987 | Bomba et al. | 364/200 |
| 4,656,356 | 4/1987 | Shiozaki et al. | 364/200 |
| 4,737,931 | 4/1988 | Ishii | 364/900 |
| 4,747,043 | 5/1988 | Rodman | 364/200 |
| 4,768,148 | 8/1988 | Keeley et al. | 364/200 |

MULTI-PROCESSOR COMPUTER SYSTEM HAVING SHARED MEMORY, PRIVATE CACHE MEMORIES, AND INVALIDATE QUEUES HAVING VALID BITS AND FLUSH BITS FOR SERIALIZING TRANSACTIONS

This application is a continuation of application Ser. No. 07/494,824, filed Mar. 15, 1990, now abandoned, which is a continuation of application Ser. No. 212,347, filed Jun. 27, 1988 now abandoned.

RELATED APPLICATION

The following patent application which is assigned to the same assignee as the instant application has been filed concurrently herewith and contains related subject matter:

Method and Apparatus for Filtering Invalidate Requests, by W. Hugh Durdan, Rebecca L. Stamm and George Michael Uhler, Ser. No. 212,416 now U.S. Pat. No. 5,058,006.

FIELD OF THE INVENTION

This invention relates generally to computer systems which utilize cache memory, and more specifically relates to multi-processor computer systems having multiple copies of shared data residing in any or all of the local cache memories.

BACKGROUND OF THE INVENTION

The architecture of a typical, single-processor computing system can be viewed as some variation of the von Neumann model of computation. According to this model, instructions and data are stored in the same memory, and the processor fetches instructions one by one from the memory, executing operations on data as specified in the instructions. As the speed of processors has increased, there has been a need to find ways to more suitably match the access time of the main computer memory to the computational speed of the processor. One known way of accomplishing this is through the use of cache memory which typically has a much faster access time than main memory, but can also be many times more expensive than main memory.

A cache memory contains some subset of the information stored in main memory, and resides between the processing unit and the system bus, which provides the data path between a processor and main memory. When a processor attempts to access a main memory location that is copied in its cache (a cache "hit"), no access to main memory is required to provide the requested value to the CPU, and the processor can resume operation more quickly. On the other hand, when the processor attempts to access a main memory location that is not copied in the cache (a cache "miss"), a main memory access must occur. In this event, the read data is sent to both the processor and to the cache, so that some subsequent attempts to access that memory location will result in cache hits. In this way, the effective memory access time for the processor is reduced to a value somewhere between the fast access time of the cache memory and the slower access time of main memory. Since the cache memory is usually smaller than main memory by an order of magnitude or more, the computer subsystem which controls the cache memory must employ methods of determining which memory location is to correspond to which cache location (the mapping function), and which cache location should be overwritten in the case that a new memory location is to be written into an already full cache (the cache replacement algorithm). Judicious selection of these configuration options can result in a cache "hit ratio" (the percentage of memory access requests that result in cache hits) of 90 to 99 percent.

Along with the increase in system efficiency resulting from the use of each memory, however, comes the problem of data coherence. That is, there must be assurance that a cache location holds the same value as the main memory location to which it corresponds. One way to maintain data coherence is to write modified values of data contained in the cache memory both to the cache memory and to the corresponding main memory location, each time memory write access to that location is requested. This method is called a "write-through" policy. Another cache coherence technique involves a "write-back" policy, in which a modified data value is not written to the slower main memory until the corresponding cache location must be overwritten. The trade off between these policies involves the requirement of greater bandwidth at the memory subsystem level in updating main memory for each write access in a write-through policy versus the increased complexity in cache coherence in a write-back policy. In systems with sufficient bandwidth, a write-through policy is often preferred due to its simplicity.

Recent decreases in the cost of processing units have facilitated the advent of a more radical departure from the von Neumann machine organization, in which a plurality of processors operate concurrently with each other, while still accessing a common main memory space via a common system bus. Each processor can have its own private cache which resides between the processor and the system bus. For such multi-processor systems, the use of cache memories is more crucial to system performance than in single processor systems, since each of the processors is in contention with the others for use of the common system bus in order to access the shared memory. The problem of data coherence is likewise more pronounced, since the value stored in a single main memory location might at one time be replicated in the private cache memory of any or all of the processors. If the local cache memories each employ a write-back policy, the system must somehow ensure that when one processor modifies the value of a memory location and writes that modification in to its cache memory, the copies of that memory location in any of the other local caches reflects the change made by that one processor.

The present invention is directed to a multi-processor computer system comprising a plurality of CPU modules which share a common memory space via a time-shared system bus, along with one or more I/O modules. The common memory space can be realized as a plurality of memory modules each containing part of the shared system memory. A CPU module includes a processor on which instructions are executed, a private cache memory unit and possibly additional supporting hardware for efficient control of the CPU module and syncronization of the CPU module with other components of the system. An I/O module interfaces the system bus to an I/O bus to enable transfers to and from input/output devices like disk drives, tape drives, display devices, printers, or modems.

As is common in the art of multi-processor systems, any of the modules interfaced to the system bus can initiate one of four kinds of transactions on the bus: null, read, write and read data transactions. The time during which a single one of these transactions is taking place on the bus is called a bus cycle. A null transaction occurs when no module requires the bus, and is ignored by all modules. A read transaction is one in which a CPU or I/O module sends a request to a memory module to return memory data. A write transaction is one in which a CPU or I/O module sends a request to a memory module to write new memory data. A read data transaction is one in which a memory module returns data to a CPU or I/O module in response to a previous read transaction. Contention for use of system bus among the various modules is arbitrated in some manner specific to the system bus implementation, and known in the art of arbitration protocols.

As part of the support hardware associated with a CPU module, known techniques in the art suggest that a structure called a Read Data Queue may be introduced between the system bus and the CPU module. This structure holds data values that have been returned from a memory module in response to read transactions. The queuing of read data enhances the performance of the system by allowing a processor to accomplish other tasks while main memory access is made, instead of waiting idly for the data to be returned. The Read Data Queue is a first-in-first-out (FIFO) queue containing multiple entries, each of which includes a data field and a valid bit. As used herein, it is understood that when a valid bit is set, it indicates that valid data is resident in that entry, i.e., that that entry is "full". If the valid bit for that entry is not set, that entry is "empty", i.e., contains no data. When the CPU module receives data from main memory via a read data transaction, that data is placed on one end of the Read Data Queue, and the valid bit is set for that entry. When the CPU is ready to accept incoming data to put in its cache memory, the first valid entry is removed from the other end of the queue, and the valid bit is cleared.

Another FIFO structure called an Invalidate Queue may also be introduced between the system bus and the CPU module. The Invalidate Queue also contains multiple entries called "invalidates", each including at least an address field and a valid bit. The CPU monitors the system bus for coherence transactions. In a system employing a write-through policy the CPU module monitors the system bus for write transactions. When any data write transaction is detected on the system bus, the address of that transaction is placed on one end of the CPU module's Invalidate Queue, and the valid bit is set, indicating that that entry is full. When the CPU is able to process an invalidate, the first valid entry is removed from the other end of the Invalidate Queue, and its valid bit is cleared. The address of the write transaction is checked against the contents of the cache, and if present, the entry corresponding to that address is marked as invalid (empty). In this way, the CPU can be prevented from using data values which are outdated.

Cache coherency in multi-processor systems is maintained when each cache memory processes transactions in the same order as they occurred on the system bus. The order of invalidates as they appeared on the system bus can be preserved by the FIFO queue that holds them. Similarly, the order of read data transactions can be preserved in their FIFO queue. Unfortunately, however, the order of invalidates in relation to read data transaction, or equivalently, the order of read data transactions relative to invalidates, as they appeared on the system bus, is not preserved by the use of separate Read Data and Invalidate queues.

All forms of this technique of serialization do not adequately solve the coherency problem. For example, one technique is to wait for the invalidate queue to become empty before transmitting any read data to the cache memory. This is not a sufficient solution to the problem of cache coherency in multi-processor systems, however, since it is possible to construct a worst-case traffic pattern in which new writes on the system bus are added to the end of the Invalidate Queue as fast as they are processed as invalidates by the cache memory. In such a situation, the read data would never be returned to the cache memory because the Invalidate Queue would never empty. The method of the present invention is not vulnerable to such pathological behavior, since it inhibits the transmission of read data to the cache only until a finite, predetermined number of invalidates have been serviced.

SUMMARY OF THE INVENTION

This invention provides a method and apparatus whereby entries from each of the CPU module queues are processed in a correctly serialized order which ensures that each CPU uses the most recently written values of shared data, maintaining data coherence among the various system components.

A multi-processor computer system designed in accordance with this invention includes a plurality of CPU modules and a plurality of I/O modules interfaced to a common system bus. These modules share access to a plurality of memory modules which define the main memory of the computer system and which are also interfaced to the time-sharing system bus. The CPU modules each include, in addition to a central processor, a local cache memory used to store some subset of the information in main memory, as well as a Read Data Queue and an Invalidate Queue which hold, respectively, data values fetched from main memory to be transmitted to the cache, and records of write transactions detected on the system bus, used to identify potentially stale data in the cache. Each entry of the Read Data Queue should have an associated bit field called the valid bit which, when set, indicates that the value in that entry is valid. The Invalidate Queue entries should each have, in addition to a valid bit, an associated one-bit field called the flush bit, which shall be used to determine which invalidates must be serviced by the cache memory before accepting read data from the Read Data Queue. These queues are FIFO structures, in which data is entered from one end and removed from the other.

When a CPU module issues a Read transaction, it copies the valid bit to the flush bit for all entries in the invalidate queue. If the valid bit for any entry in the invalidate queue was a zero when the Read was issued, the flush bit is also zero after this operation. Likewise, if the valid bit for any entry was a one, the flush bit also becomes a one. In this way, the CPU module can keep track of the Invalidate Queue entries that were valid when the read transaction was initiated.

Before the CPU can accept read data from main memory into its cache memory, it first processes all of the Invalidate Queue entries that were valid when the read transaction was issued. The CPU is then assured that the data in its cache represents an accurate copy of the corresponding main memory data at the time the read transaction was issued.

This does not mean that all valid Invalidate Queue entries must be processed before the CPU can accept read data. Only entries which were valid before the read transaction took place need to be serviced before accepting read data. Invalidates which were entered into the Invalidate Queue during the time between the read transaction and the read data transaction will have only their valid bit set, not their flush bit, and those entries do not represent changes to main memory data made prior to the initiation of the read transaction.

DETAILED DESCRIPTION OF A PREFERRED EMBODIMENT

Figure 1:
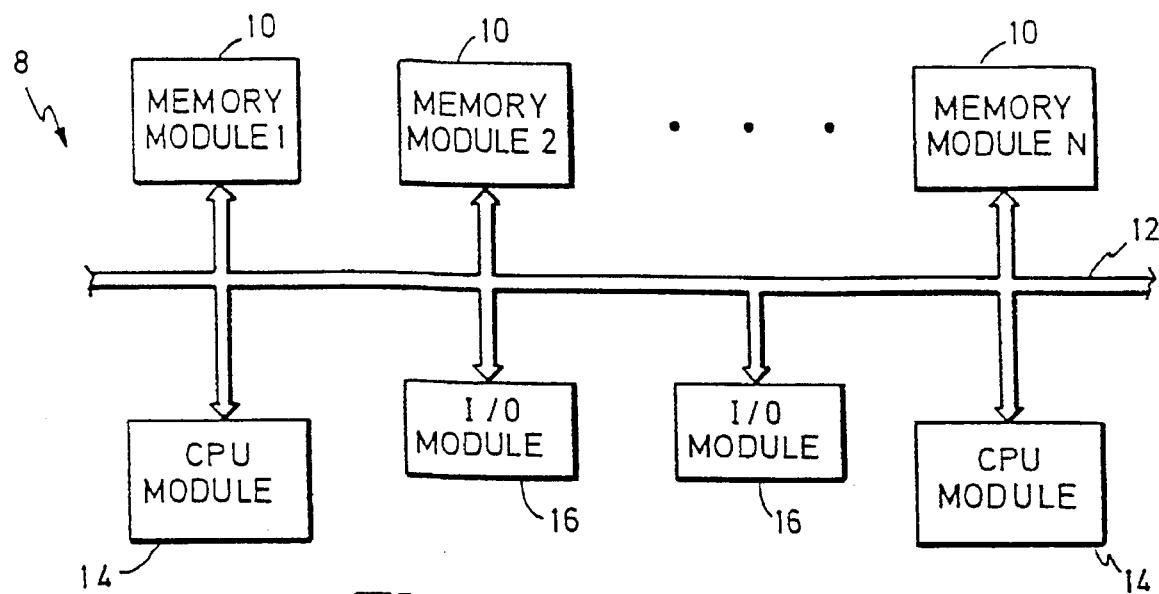
FIG. 1 is a block diagram of a multi-processor computer system, including a plurality of memory modules comprising the shared main memory, a number of CPU modules and a number of I/O modules, all interfaced to a common system bus.

The general configuration of a multi-processor based computer system 8 in accordance with the present invention is shown in FIG. 1. A plurality, N, of memory modules 10 comprising the shared main memory of the system are provided and are interfaced to a common system bus 12 by means dependent upon the implementation of the bus in a manner known in the art. In practice, the number N of memory modules 10 can be any number greater than or equal to one, depending on the desired implementation of main memory. A plurality of processor (CPU) modules 14 are also provided. Although the present invention is directed to computer systems utilizing two or more processor modules 14, for clarity only two are shown. Similarly, any number of I/O modules 16 can be interfaced to the system bus 12, while only two are shown in FIG. 1.

Figure 2:
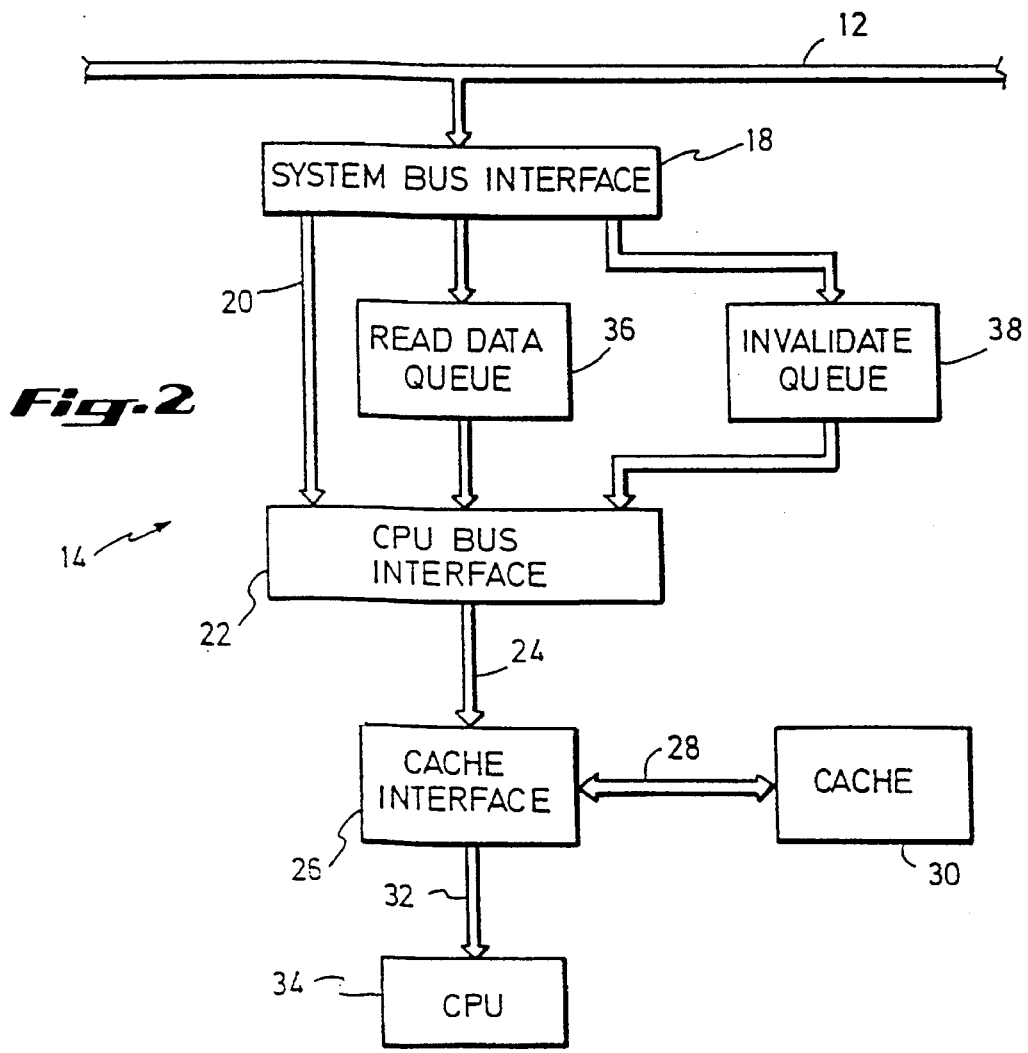
FIG. 2 is a detailed block diagram showing the functional units of an individual CPU module from FIG. 1, as interfaced to a system bus.

A CPU module 14 which employs the present invention is depicted in FIG. 2, as interfaced to the system bus 12. A system bus interface 18, corresponding to each CPU module 14 and electrically connected to the system bus 12, is responsible for establishing a communication link between each corresponding CPU module 14 and other CPU modules 14, I/O modules 16 and memory modules 10 via the system bus 12. Another bus connection 20 is made between the system bus interface 18 and a CPU bus interface 22. This connection 20 provides the path of requests for read and write main memory access generated by a cache interface 26 and provided to the CPU bus interface 22 via a CPU bus 24. The cache interface 26 is responsible for mediating between the CPU 34 and the cache memory 30 via a CPU data bus 32 and a cache bus 28, respectively.

A memory read initiated by the CPU 34 according to this embodiment of the invention proceeds as follows: The CPU 34 sends a request for a memory read at a specified memory location out onto the data bus 32 where the request is received by the cache interface 26. The cache interface 26 uses the cache bus 28 to access the cache 30 in order to determine whether the requested memory location is copied in the cache 30 and is valid. If so, the cache interface 26 returns this value to the CPU 34. If the desired memory location is not duplicated in the cache 30 or if the cache copy of the value is marked as not valid, the cache interface 26 forwards the memory read request via CPU bus 24 to the CPU bus interface 22. From here, the request is forwarded to the system bus interface 18 via the electrical connection 20. The system bus interface 18 is responsible for participating in the appropriate bus arbitration protocol required for it to be granted access to the system bus 12. Once access is granted, the system bus interface 18 initiates a read transaction on the system bus 12, indicating to the memory modules 10 the value of what memory location is desired by the CPU 34. The memory read process just described is typical of any read initiated by the CPU 34, whether the desired location in memory 10 holds a numerical operand, a memory address, or an instruction opcode.

The sequence of events for a CPU initiated memory write is as follows: The request for a memory write is passed from the CPU 34 to the cache interface 26 via the CPU data bus 32. The cache interface 26 uses the cache bus 28 to determine whether the desired memory location is also resident in the cache 30, and if so, the new value is written in place of the old value. In keeping with the write-through cache policy, the cache interface 26 forwards the write request across the CPU bus 24 to the CPU bus interface 22 regardless of whether or not the desired location was copied in the cache 30. From the cache interface 26 the request travels along the electrical connection 20 to the system bus interface 18. When the system bus interface 18 is granted system bus access, it sends the write request to main memory 10 via the system bus 12.

Another function of the system bus interface 18 is that of monitoring all of the transactions which occur on the system bus 12. Whenever a write transaction is issued by any of the CPU modules 14 or any of the I/O modules 16, the system bus interface 18 in each of the CPU modules 14 has the responsibility of entering the address of that transaction into an Invalidate Queue 38 described herein in relation to FIG. 3.

Figure 3:
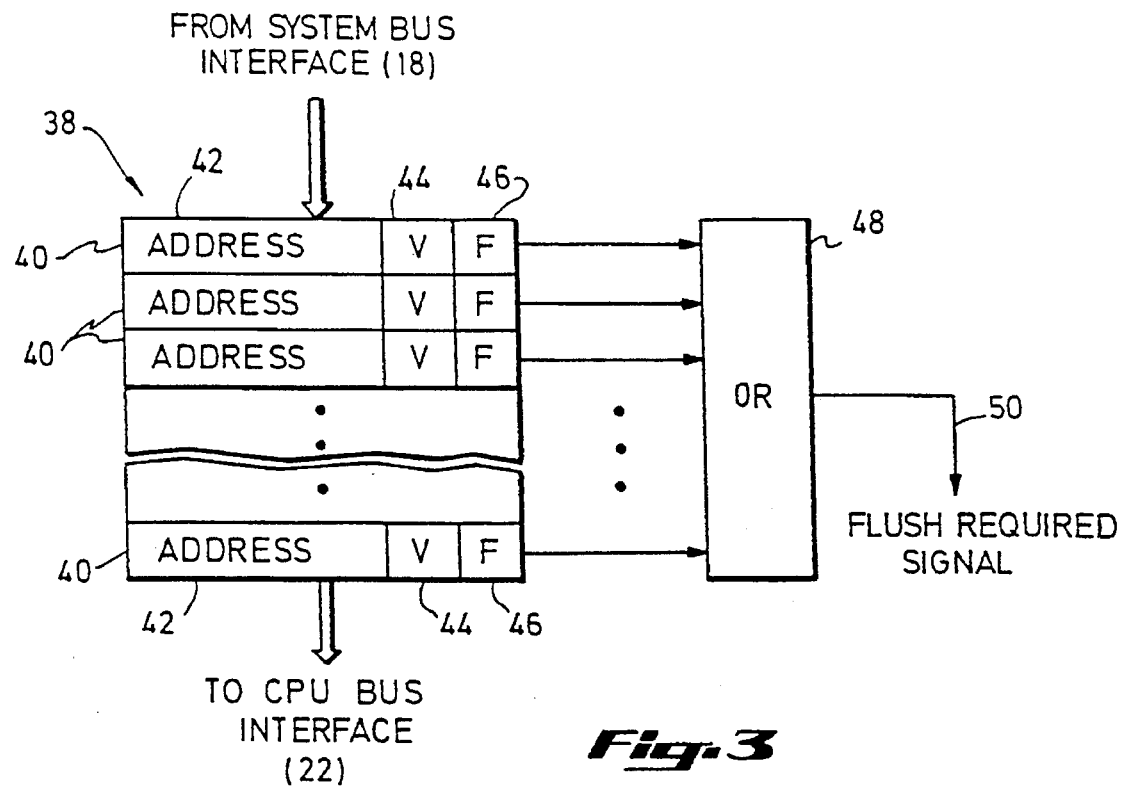
FIG. 3 is a diagram of the Invalidate Queue of FIG. 2.

Referring to FIG. 3, the Invalidate Queue 38 is a first-in-first-out (FIFO) queue, which in a preferred embodiment of the invention comprises a set of entries 40 each having an address field 42, a valid bit field 44 and flush bit field 46. The multiple-bit address field 42 holds the main memory address of the target location of a write transaction. The single-bit valid bit field 44 indicates which of the queue entries 40 hold valid invalidates. A final one-bit flush bit field 46 is used as described hereinafter to determine which queue entries 40 were valid at the time that a read transaction was issued by the associated CPU module 14. The flush bit fields 46 of all the entries 40 in the Invalidate Queue 38 are used as the inputs to a multiple input logical "OR" gate 48. The output 50 of the "OR" gate 48 carries a "Flush Required" signal. The Flush Required signal is high (a logical one) whenever any of the flush bit fields 46 in the Invalidate Queue 38 contains a logical one; the Flush Required signal is low (a logical zero) only in the case that none of the flush bits 46 in the invalidate queue 38 is set (i.e., contains a logical one).

Figure 4:
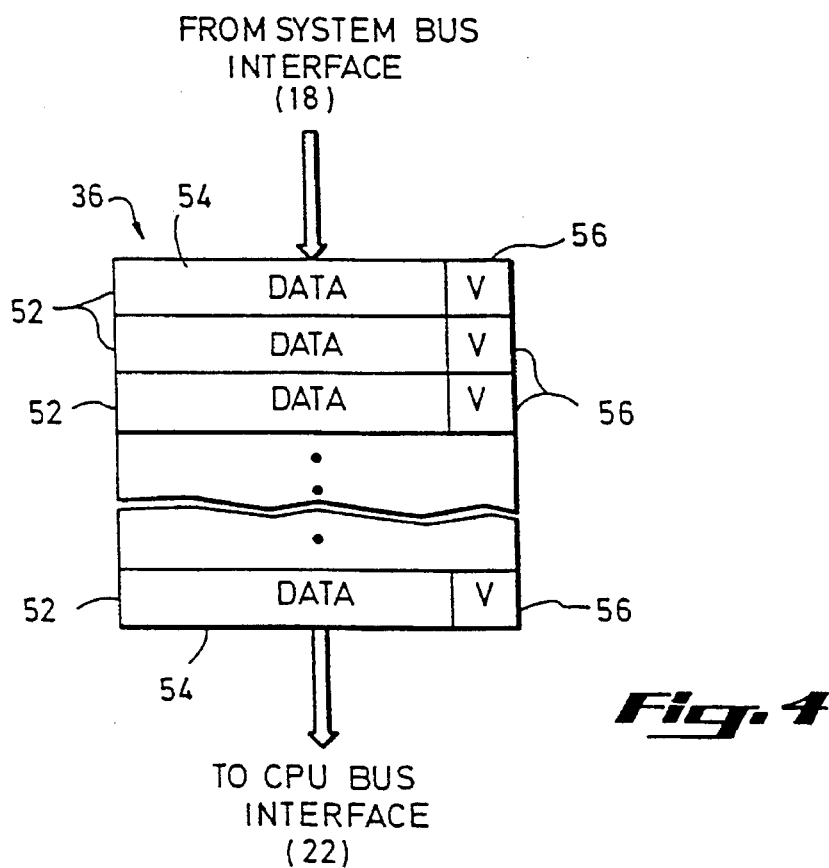
FIG. 4 is a diagram of the Read Data Queue of FIG. 2.

A third kind of bus transaction, a read data transaction, is initiated by the main memory management logic in order to return the contents of a main memory location to the processor which requested the data by means of a read transaction. Referring again to FIG. 2, a read data transaction issued by one of the main memory modules 10 is received by the system bus interface 18. The data does not pass directly to the CPU bus interface 22, but is instead entered into a Read Data Queue 36 which, like the Invalidate Queue 38, is situated between the system bus interface 18 and the CPU bus interface 22. The Read Data Queue 36 as shown in FIG. 4 comprises a set of multiple-bit entries 52 each having two fields, a data field 54 and a valid bit field 56. The data field 54 holds the contents of a memory location returned by the memory controller in response to a read transaction. The valid bit field 56 is a one-bit field which indicates whether the data in the data field 54 is valid. Like the Invalidate Queue 38, the Read Data Queue 36 is a FIFO structure which accepts data from the system bus interface 18 at one end, and passes data to the CPU bus interface 22 from the other end.

System wide data coherence is enforced by the mechanism of this invention in the following way: When the system bus interface 18 sends a read transaction to the main memory on the system bus 12, it copies the valid bit 44 to the flush bit 46 for all entries 40 in the Invalidate Queue 38, so that all entries 40 which were valid at the time the read transaction was issued have their flush bit 46 set (i.e. contain a logical one), and all entries 40 which were not valid when the read transaction was issued have their flush bit 46 reset (i.e., contain a logical zero). The CPU module 14 must process all of the invalidates in the Invalidate Queue 38 that have their flush bits set before the received contents can be passed to the CPU cache 30. In this way, invalidates are processed during the time that main memory is being accessed and read data is being returned, so that memory access and invalidate processing occur in parallel. The number of invalidates to be processed before the CPU cache 30 is allowed to have the read data is guaranteed to be less than or equal to the number of entries 40 in the Invalidate Queue 38, so after the finite amount of time that the CPU module 14 takes to empty the Invalidate Queue 38 of entries 40 with flush bits 46 set, the CPU cache will be assured of gaining access to the incoming data, which is stored in the Read Data Queue 36. In this manner, the present invention ensures correct serialization of invalidates with the return of the read data and guarantees the correct operation of shared data protocols.

The following example illustrates the problem of data coherency in a multi-processor system and how the present invention solves this problem: In a multi-processor system with two processor modules, CPU 0 and CPU 1, the variable V is a datum shared between the two processors. Another variable, T, is a "flag" used to synchronize the access to V by the two processors, in a manner known in the art of mediating concurrent access to shared data. In particular, when T is non-zero, the contents of the variable V are valid. When T is zero, the contents of the variable V are not valid.

Assume that variable T initially has a value of zero, which indicates to either CPU module that the value of variable V is not valid, and that variable T is not in the CPU 1 cache memory but variable V is in the CPU 1 cache memory.

Next, assume that CPU 0 writes a value to location V, then writes a non-zero value to location T indicating that the newly written value of V is valid. Immediately after these two write transactions, CPU 1 begins executing a busy-wait loop, checking the value of variable T at the beginning of each iteration of the loop to see if the value of V has become valid. Once CPU 1 sees a non-zero value of T, it would exit the busy-wait loop and continue processing. Recall that the value of T is not in the CPU 1 cache, so upon the first execution of the busy-wait loop, CPU 1 sends a read transaction across the system bus, requesting the value of variable T from main memory.

Since CPU 0 has just written a non-zero value of T to the main memory, the read data returned to CPU 1 will reflect this change, indicating to CPU 1 that the current value of variable V is a valid one. At this point, without consideration to cache coherency, CPU 1 could read the value of variable V from its cache, and continue processing using this value. Since this cached value was present before CPU 0 wrote a new value of V to the memory, however, CPU 1 would receive a "stale" or incoherent value of V from its cache.

The technique of cache invalidation can prevent the use of stale data, but only if the invalidates are processed in the appropriate order with regard to other system bus transactions. In this case, the system must ensure that the invalidate corresponding to the CPU 0 write to location V is serviced by CPU 1 before the read data value of T is returned to CPU 1 from main memory. The present invention enforces a proper order of service by inhibiting the return of the read value of T to CPU 1 until the "necessary" invalidates have been processed by CPU 1. The "necessary" invalidates are those that were present in CPU 1's Invalidate Queue at the time it issued the read data transaction requesting the value of T. These Invalidate Queue entries were marked accordingly by the copying of valid bits to flush bits at the time CPU 1 is issued its read transaction. In this example, CPU 1 would be forced to invalidate the value of V in its cache before being allowed to receive the value of T from main memory.

What is claimed is:

1. In a computer system having a main memory for storing a set of data, said computer system further having a plurality of processors, each processor having an associated cache memory for storing a subset of the data stored in said main memory, said computer system further having a system bus for intercoupling the processors and the main memory and for intercoupling each of the processors with any other of the processors, an apparatus for maintaining the integrity of data stored in the main memory and in the cache memories comprising:

a. a read data queue for each processor, said read data queue coupled to said system bus, said read data queue having a plurality of entries, each entry having a data field for storing read data to be processed into said processor's cache memory and a valid bit field for identifying a full read data entry; and an invalidate queue for each processor, said invalidate queue having a plurality of entries, each entry having an address field for storing invalidates, a valid bit field for identifying a full invalidate entry and a flush bit field for indicating an invalidate to be processed, wherein upon initiation of a read request by any of said processors for data for which the memory address of that data is not resident in the cache corresponding to said processor, said processor directs that the valid bit field for each entry in its associated invalidate queue be read to its associated flush bit field and commences processing all invalidates for which a flush bit is set while inhibiting the processing of read data values from the read data queue until all said invalidates have been processed.

2. In a computer system having a main memory and further having a plurality of processors, each of said processors having an associated cache memory, and each of said processors further having a read data queue, said read data queue having a plurality of entries, each of said entries having a data field for holding a read data value to be processed to the processor's associated cache memory and a valid bit field for indicating a full read data value, each of said processors further having an invalidate queue, said invalidate queue having a plurality of entries, each of said entries having an address field for holding an invalidate value to be processed to the processor's associated cache memory, a valid bit field for indicating a full invalidate value and a flush bit field for indicating an invalidate value which is to be processed before the next read data value is to be processed, a method of maintaining the coherency of the data in the main memory and the cache memories comprising:

a. issuing a read transaction from one of said processors for which the memory address of the requested data is not resident in the cache of said processor;

b. copying each valid bit in the invalidate queue to its associated flush bit to set selected flush bits;

c. commencing the processing of all invalidates in the invalidate queue for which its associated flush bit is set;

d. issuing a read data transaction from the main memory of the system to the read data queue of the processor issuing the read transaction;

e. pausing the processing of the contents in the read data queue to its corresponding cache memory until all of the invalidates having flush bits set have been processed; and f. continuing to process the contents in the read data queue to its corresponding cache memory.

3. A computer system comprising:

a main memory for storing a set of data;

a plurality of processors for processing data, each of said processors having coupled to it a secondary memory for storing a subset of the data stored in said main memory, each of said processors further including means for issuing read requests to read data from said main memory;

a system bus for interconnecting said main memory and each of said processors;

each of said processors having invalidate means for storing addresses of data in said secondary memory that are invalid wherein said invalidate means further includes a FIFO memory containing a plurality of memory locations and each one of the memory locations has a field for one of said addresses of data that are invalid and a field for a flush bit; and serialization means responsive to said flush bits and activated, after the issuance of one of said read requests, to process all addresses which are in said invalidate means at the time of said issuance of the read request before any data in response to said read request are loaded to said secondary memory.

4. A system according to claim 3 wherein each of said processors has buffer storage means in a path between said system bus and said secondary memory, said buffer storage means storing data read from said memory in response to said read requests before said data is loaded to said secondary memory.

5. A system according to claim 4 wherein said invalidate means in each processor includes logic means responsive to all of said flush bits to control said serialization means.

6. A method of operating a computer system of the type having a plurality of processors sharing a main memory, each of said processors having a cache, where each of the processors may initiate read requests and write requests to said main memory, comprising the steps of:

temporarily storing in each of said processors addresses of write requests made by other of said processors, temporarily storing in each of said processors data received from main memory in response to a read request by a processor, setting a valid bit for each of said temporarily stored addresses to indicate that an address is stored in a location, and, loading said data received from main memory to said cache only after checking said addresses of write requests occurring before said read request, Wherein said checking includes activating, based upon said valid bits, an indicator for each of said temporarily stored addresses existing when a read request is initiated.

7. A method according to claim 6 including the step of detecting whether any of said indicators are activated before said step of moving data to said cache.

8. A computer system comprising a plurality of processors sharing a main memory via a common system bus, each of said processors having a cache, each of said processors making read requests and write requests to said main memory via said system bus, each of said processors including:

means for temporarily storing addresses of write requests made to main memory, said means for temporarily storing addresses including means for Setting an indicator bit for each store address existing when a read request is made and means for setting a valid bit for each location into which a write address is stored;

a buffer for storing data received from main memory in response to a read request by the processor, and means for checking said addresses of write requests occurring before a give read request made by the processor before loading said data from said buffer to said cache, said checking means further including means for loading all of said valid bits to said indicator bits.

9. A system according to claim 8 wherein said means for checking includes means for detecting whether or not any of said indicator bits are set.

* * * * *